United States Patent [19]

Kilner et al.

[11] Patent Number: 4,493,509
[45] Date of Patent: Jan. 15, 1985

[54] TWO-FLUID NONFLAMMABLE HYDRAULIC SYSTEM

[75] Inventors: Jerome R. Kilner, Bellevue; Eugene T. Raymond, Kent; Steven M. Warren, Seattle, all of Wash.

[73] Assignee: The Boeing Company, Seattle, Wash.

[21] Appl. No.: 451,655

[22] PCT Filed: Sep. 27, 1982

[86] PCT No: PCT US 82/01335
   § 371 Date: Sep. 27, 1982
   § 102(e) Date: Sep. 27, 1982

[87] PCT Pub. No: WO84/01333
   PCT Pub. Date: Apr. 12, 1984

[51] Int. Cl.³ .............................................. B60T 11/10
[52] U.S. Cl. ...................................... 303/13; 244/111
[58] Field of Search ............... 188/181 A; 244/111, 244/129.2; 303/1, 9, 63, 85, 86, 92, 93, 100, 116

[56] References Cited

U.S. PATENT DOCUMENTS

| | | | |
|---|---|---|---|
| 2,126,062 | 8/1938 | Valery et al. | 188/3 |
| 2,248,435 | 7/1941 | Pleines | 188/3 |
| 2,325,846 | 8/1943 | Forbes | 188/3 |
| 2,362,324 | 11/1944 | Stromberg | 188/3 |
| 2,504,096 | 4/1950 | Wells | 244/111 |
| 3,211,500 | 10/1965 | Lawson | 303/22 |
| 3,672,729 | 6/1972 | Blakey | 303/9 |
| 3,945,685 | 3/1976 | Page et al. | 303/2 |
| 4,174,394 | 4/1979 | Klimek et al. | 303/9 X |
| 4,264,111 | 4/1981 | Shimizu et al. | 303/92 X |

FOREIGN PATENT DOCUMENTS

2703760 8/1978 Fed. Rep. of Germany ...... 303/116

*Primary Examiner*—Duane A. Reger
*Attorney, Agent, or Firm*—Delbert J. Barnard

[57] ABSTRACT

A relatively expensive, relatively heavy, and relatively nonflammable hydraulic fluid (chlorotrifluorethylene) is used in an aircraft ground wheel brake system between the piston (72) of a deboost device (68) and a set of wheel brakes (196). A relatively cheaper and relatively lighter, conventional hydraulic fluid (MIL-H-5606), which is also relatively flammable, is used in the remainder of the system. A replenish system for the relatively nonflammable fluid includes a reservoir divided into two chambers by a piston. One chamber contains a quantity of the relatively nonflammable fluid and the other chamber is connected to the system pressure. The deboost device includes a replenish valve which is opened in response to a position of the deboost piston. Replenishment only occurs when the brakes are applied and replenishment is necessary. At other times, all portions of the brake system are at return pressure. The relatively nonflammable hydraulic fluid acts as a buffer between heat generated at the brakes and the relatively flammable fluid.

28 Claims, 9 Drawing Figures

TWO-FLUID NONFLAMMABLE HYDRAULIC SYSTEM

DESCRIPTION

1. Technical Field

The present invention relates to hydraulic systems for aircraft and the like, such as aircraft ground wheel braking systems. More particularly, it relates to a two-fluid system and method for preventing fire damage and danger caused by the ignition of hydraulic fluid on hot surfaces.

2. Background Art

The Air Force has become increasingly concerned about the danger and dollar loss caused by aircraft hydraulic fires. During the 1965-1979 time period, the Air Force experienced approximately 153 noncombat hydraulic fires with an associated dollar loss of over 179 million. A major cause of these fires is the ignition of hydraulic fluid on hot surfaces. During the 1970 to 1975 time period, about sixty-three percent of the hydraulic fluid fires occurred in the wheel well and/or landing gear area. Most of these fires were related to the ignition of hydraulic fluid on hot brakes.

The hydraulic fluid currently used on most military aircraft is a petroleum-based mineral fluid, per military specification MIL-H-5606, which has a low manifold ignition temperature and high heat of combustion, and burns quite readily. On some recent aircraft, a synthetic hydrocarbon fluid per MIL-H-83282 is being used because of its gunfire resistance and somewhat lower overall flammability characteristics. However, it also has a relatively low hot-surface ignition temperature.

Although these fluids are used throughout such aircraft, the brake, steering, and landing gear hydraulic actuation systems are statistically the most vulnerable. For example, when a hydraulic failure occurs in which these hydrocarbon fluids contact a hot brake, rapid ignition of the fluid occurs creating intense heat which ignites other fuel sources (such as the tire) that sustain the fire after the hydraulic fluid source is depleted.

In an effort to reduce the occurrence of aircraft hydraulic fires, the Air Force initiated a program to develop a nonflammable hydraulic fluid. This effort led to the development of chlorotrifluoroethylene (CTFE) base hydraulic fluids. Although virtually nonflammable, the principal disadvantage of the CTFE hydraulic fluid is its high specific gravity (density) which is 2.11 times that of the MIL-H-5606 fluid. In addition, the CTFE fluid is not compatible with most seal elastomer materials commonly used in MIL-H-5606 fluid hydraulic systems, and CTFE fluid cost for high production quantities is very high compared to aircraft hydraulic fluids presently in use.

The use of CTFE fluid in aircraft hydraulic systems would greatly alleviate fire danger and result in a significant improvement in aircraft safety. However, replacing MIL-H-5606 fluid with CTFE fluid throughout the entire aircraft hydraulic system would result in a significant weight penalty due to the increase in fluid density (e..g., +1700 lbs for the YC-14 advanced medium STOL cargo aircraft). This weight penalty can be reduced to approximately 64 lbs for a cargo/transport aircraft and 30 lbs for a fighter aircraft by employing the two-fluid nonflammable brake hydraulic system of the present invention in which the heavy CTFE fluid is used only in the hydraulic lines to the wheel brakes.

DISCLOSURE OF THE INVENTION

In accordance with the present invention, two different hydraulic fluids are used in a control system. A first hydraulic fluid, which is relatively flammable but otherwise desirable, is used in the system upstream of a piston in a pressure transmitter which serves to mechanically separate the two fluids. A relatively nonflammable second hydraulic fluid, having characteristics making it undesirable as a single fluid in the system, is used in the system between the isolator piston and an actuator which is in use adjacent a load which produces a considerable amount of heat. An example of such a load is the friction surfaces of an aircraft ground wheel brake.

In accordance with an aspect of the invention, makeup nonflammable hydraulic fluid is introduced into the system between the piston and the actuator whenever the quantity of such fluid drops below a predetermined value.

A preferred replenish system comprises a reservoir and means for delivering the hydraulic fluid from the reservoir into the system when needed.

The system may include a replenish value which is adapted to open in response to a need for additional second hydraulic fluid in the system. The replenish reservoir may comprise a housing and a follower in the housing dividing the housing into a reservoir chamber for the second hydraulic fluid on one side of the follower and a feed pressure chamber on the opposite side of the follower. In preferred form, system pressure, supplied by the first hydraulic fluid, is introduced into the feed pressure chamber at the same time that it is applied against the piston, and replenishment occurs during operation of the actuator. In a braking system, this would occur whenever (1) the brakes are applied and (2) there is a need to replenish the second hydraulic fluid portion of the actuator system.

In accordance with another aspect of the invention, the mechanical divider between the two hydraulic fluids also performs a deboost function.

Yet another aspect of the invention relates to a construction of the mechanical isolator which permits the use of two different types of seals. A first seal constructed from a material which is compatible with the first hydraulic fluid is used to seal between the pressure transmitter piston and its surrounding portion of the pressure transmitter housing. A second seal constructed from a second material that is compatible with the second hydraulic fluid is used to seal between the pressure transmitter piston and its surrounding portion of the housing. In preferred form, an air chamber is provided in the housing between the two seals so that, if any leakage occurs through either one or both of the seals, the leakage will be into the air chamber.

Further aspects of the invention are set forth in the detailed description of the preferred embodiment, all of which details are considered to be a part of the present invention.

BEST MODE FOR CARRYING OUT THE INVENTION

Figure 1:
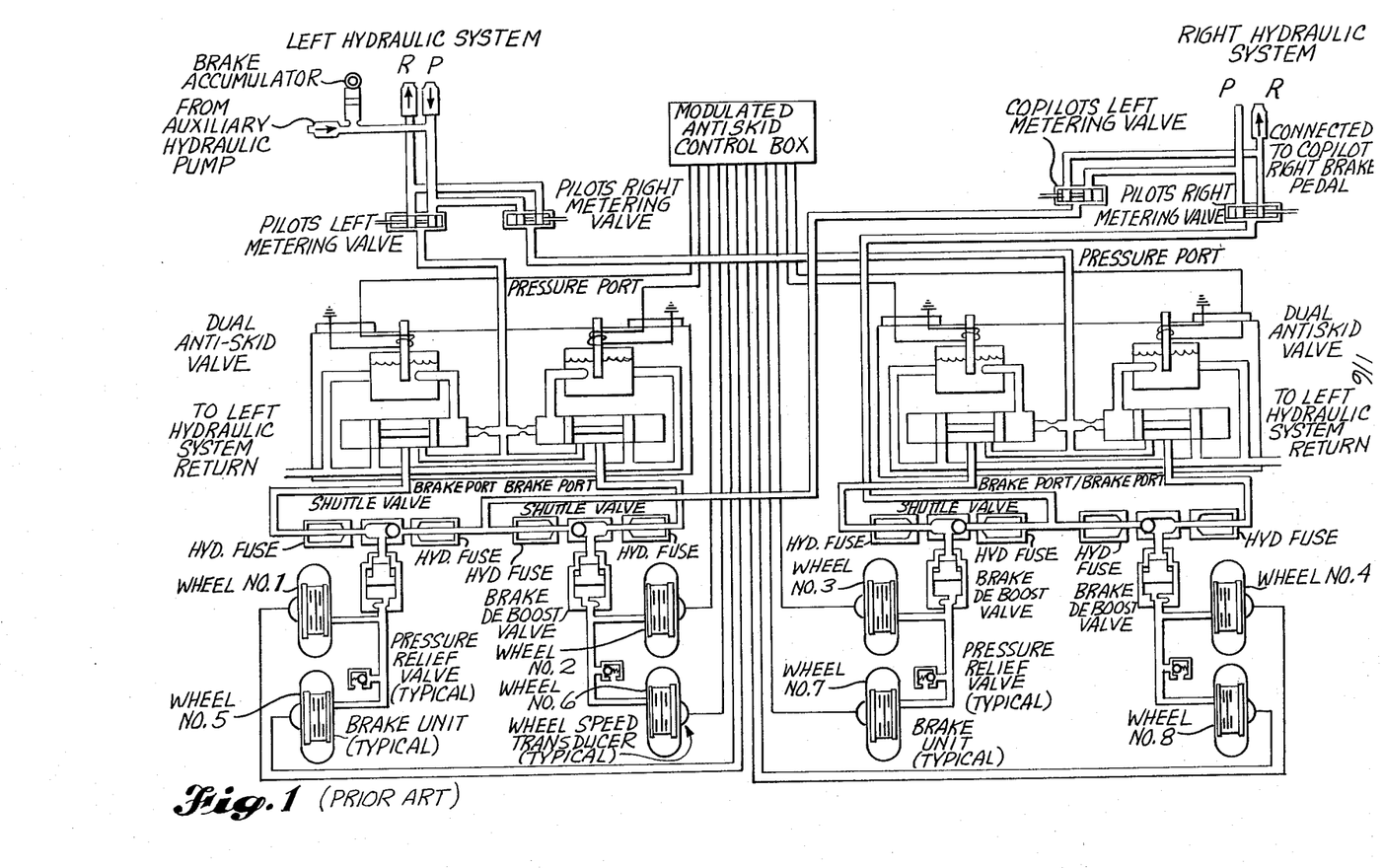
FIG. 1 is a schematic diagram of an entire existing or prior art aircraft ground wheel braking system.
Figure 2:
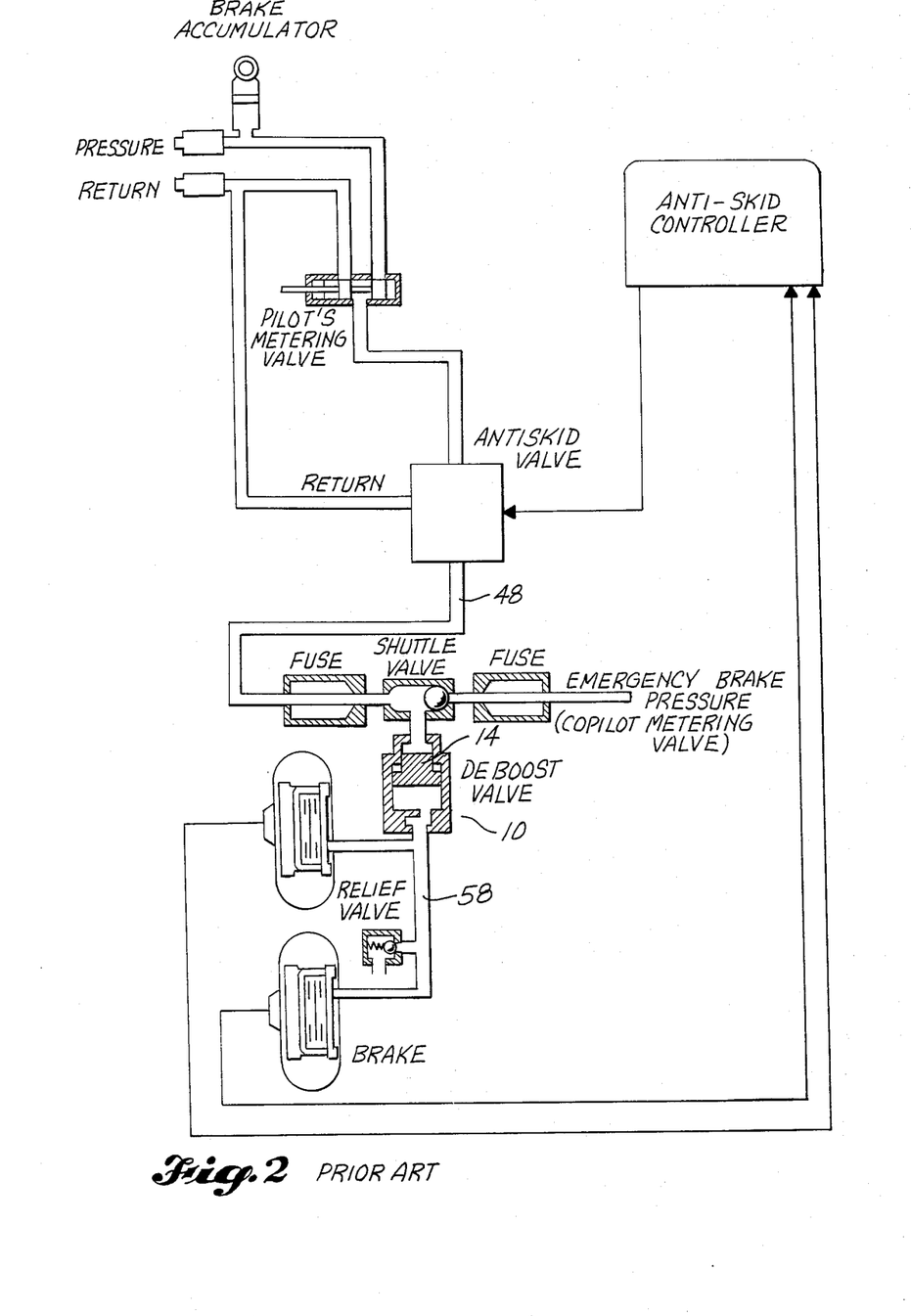
FIG. 2 is an enlarged scale hydraulic system of that portion of the system shown by FIG. 1 which is associated with a single tandem-wheel pair.

An example of an existing aircraft ground wheel braking system is shown by FIGS. 1–4. A system of this type is used in the KC-135 military tanker/transport aircraft. This particular aircraft employs a truck-type main landing gear with paired-wheel brake control. That is, the brake pressure associated with each forward and aft wheel pair on one side of the truck is controlled by a single antiskid valve and control system. FIG. 1 is a schematic diagram of the entire system. FIG. 2 is a schematic diagram of only that portion of the system which is associated with a single tandem-wheel pair.

Figures 3, 4:
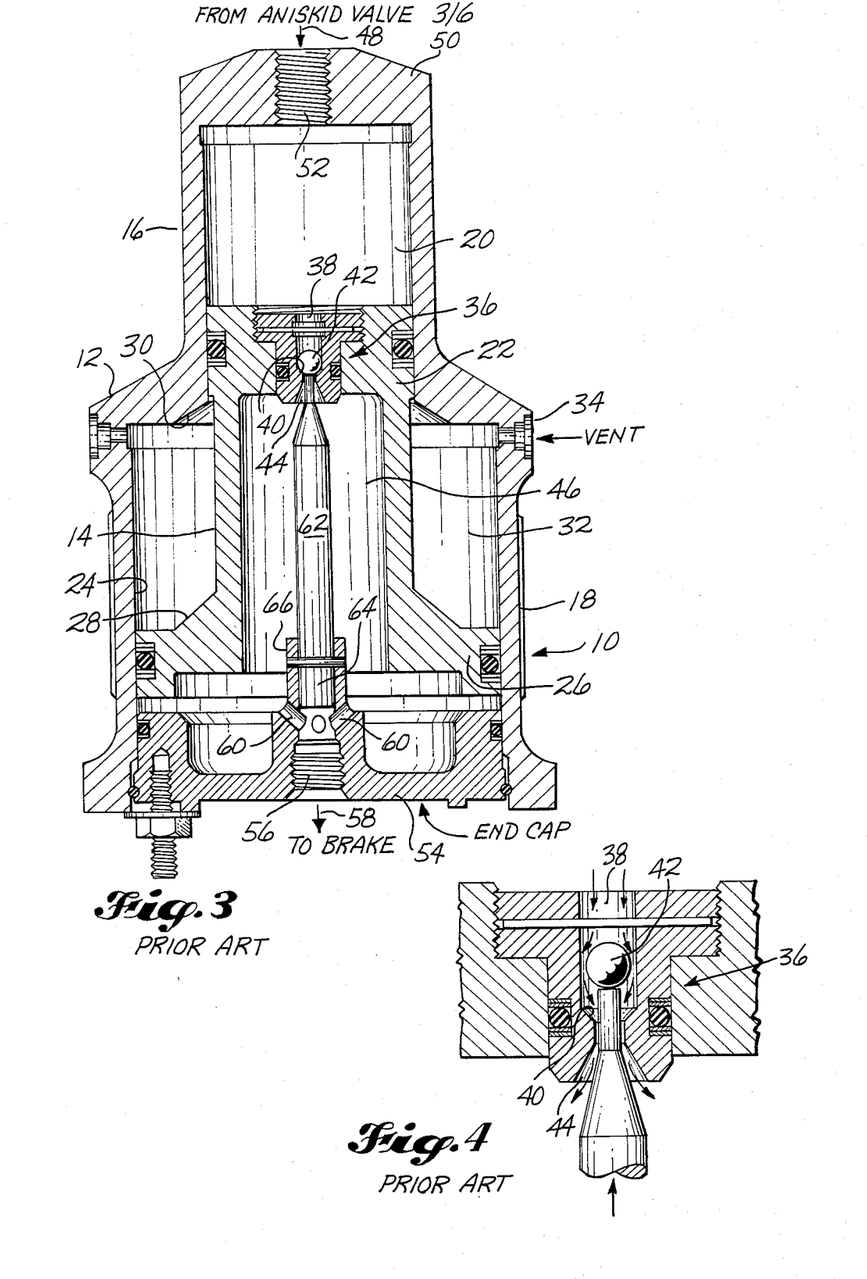
FIG. 3 is a longitudinal sectional view taken through the deboost valve shown in FIGS. 1 and 2, said view showing the check ball portion of the replenishment valve in a closed position.
FIG. 4 is an enlarged scale fragmentary view in the region of the replenishment valve, showing such valve in an open position.

Referring to FIGS. 3 and 4, the prior art system includes a mechanism 10 which is termed a "deboost valve". It comprises a differential housing 12 containing a differential piston 14. Specifically, housing 12 comprises a relatively small first-end portion 16 and a larger second-end portion 18. Housing portion 16 defines a chamber 20 in which a small-diameter portion 22 of the piston reciprocates. Housing portion 18 defines a larger chamber 24 in which the larger second-end portion 26 of piston 14 reciprocates. The piston 14 includes a shoulder 28 defined where the small and large-diameter portions of the piston 14 meet. Housing 12 includes a shoulder 30 formed where the small and large-diameter portions 16, 18 of the housing 12 meet. A variable-volume chamber 32 is defined axially between the two shoulders 28, 30 and radially between piston portion 14 and housing portion 18. This space 32 is vented to the atmosphere via a vent 34, so that the air in it will not be trapped and retard the movement of piston 14. The small-diameter end of piston 14 is formed to include an axial opening in which a replenish valve 36 is situated. This valve includes an axial passageway 38 leading to a valve seat 40 (FIG. 4). A ball closure member 42 is normally held into a seated position by fluid within chamber 20.

The piston 14 is hollow. A central orifice 44 provides a way of communicating passageway 38 with the interior 46 of piston 14.

As shown by FIGS. 1 and 2, a conduit 48 is connected to the first end 50 of the housing 12. Hydraulic fluid from conduit 48 flows into and outfrom chamber 20 via an end opening 52.

The opposite end of the housing 12 is closed by means of an end cap 54. End cap 54 comprises a central opening 56 which is in communication with a conduit 58 which connects the second end of deboost valve 10 with the wheel brakes (FIGS. 1 and 2). A plurality of ports 60 communicate the interior 46 of piston 14 with passageway 56. A central replenish pin 62 is secured at its base end 64 to a central portion 66 of end cap 54. The opposite end of replenish pin 62 is aligned with orifice 44.

The KC-135 aircraft employs MIL-H-5606 hydraulic fluid on both sides of the piston 14. The piston 14 is provided to perform a deboost function. The system pressure upstream of piston 14 is relatively high, e.g. approximately 3,000 psi. The differential piston 14 reduces this pressure in that portion of the system between the piston 14 and the wheel brake. The area ratio of piston 14 is approximately three-to-one.

The ball member 42 remains seated and closes the orifice 44 during movement of the piston 14 between the position shown by FIG. 3 and any other position in which piston 14 is located closer to end wall 50. However, whenever piston 14 moves towards end cap 54 beyond the position shown by FIG. 3, the upper end of pin 62 will contact and hold valve ball 42 in position. The valve seat will be moved away from ball 42. This will open the orifice 44 and will allow hydraulic fluid in chamber 20 to flow through the orifice 44 into the space 46. Such fluid will continue to flow until a pressure build-up which occurs on the brake side of the piston 14 causes movement of the piston 14 back into the position shown in FIG. 3. When this happens, ball 42 will again become seated and will close the orifice 44. In this manner, a proper amount of hydraulic fluid is maintained in the system between the piston 14 and the hydraulic brakes.

Figure 9:
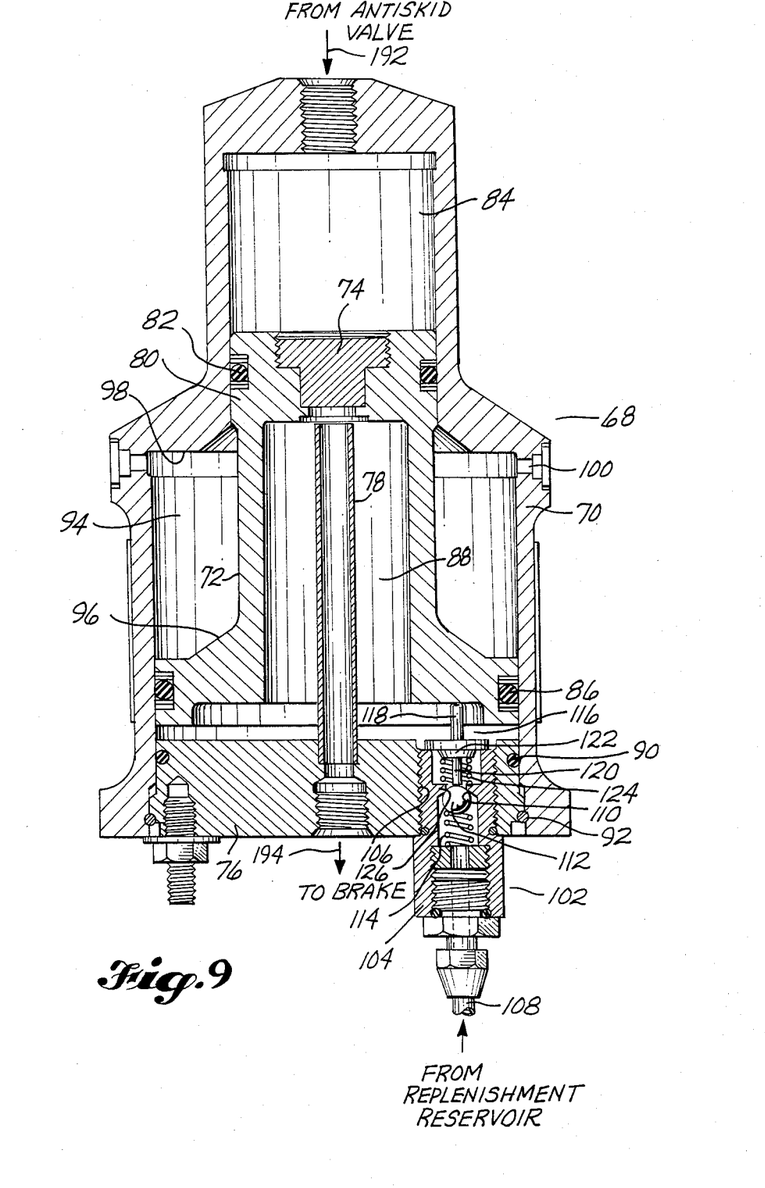
FIG. 9 is an enlarged scale axial sectional view of the pressure transmitter, showing the piston in a down position against the poppet at the threshold of opening the ball check valve.

The two-fluid concept of the present invention utilizes the deboost device's ability to function as an isolator for the two fluids. Referring to FIGS. 7 and 9, the pressure transmitter 68 may be composed of many components of the deboost device 10. The housings 70 and 12 are identical, and the pistons 72 and 14 are identical. The replenishment valve 36 has been replaced by a plug 74. The old end cap 54 and the replenish pin 62 have been replaced by a new end cap 76 and a stand pipe 78. In the two-fluid system shown by FIGS. 5–9, the standard hydraulic fluid (e.g. MIL-H-5606) is still used upstream of piston 72. The nonflammable hydraulic fluid, e.g. CTFE, is used between the piston 72 and the brake or other actuator, depending upon the use to which the system is put.

Referring to FIG. 9, the small-area end portion 80 of piston 72 carries an O-ring or other elastomer seal 82 within a circumferential groove. A seal material is used which is compatible with the hydraulic fluid within chamber 84. By way of example, a Buna N Nitrile seal can be used when MIL-H-5606 fluid is used within chamber 84.

A similar O-ring or other elastomer seal 86 is carried within a circumferential groove formed in the large area end of the piston 72. The material used for seal 86 is compatible with the hydraulic fluid which exists within the inner space 88 of piston 72. The same material is used for seals 90 and 92. At this time, phosphonitrilic fluoroelastomer (PNF), marketed by the Firestone Company, is the best material found for O-rings and other elastomer seals intended for use in the region of the CTFE fluid. As in the system shown by FIG. 3, the region 94 which is defined axially between piston shoulder 96 and housing shoulder 98 and radially between piston 72 and housing 70, is an air space and is preferably vented to the atmosphere via vent passageways 100.

Thus, any leakage occurring across seal 82 or seal 86 will be into the space 94 and not into the region of the other seal 82 or 86. If leakage is not excessive, the stepped construction of the housing will help prevent leakage from one seal region to reach the other seal region.

Figure 5:
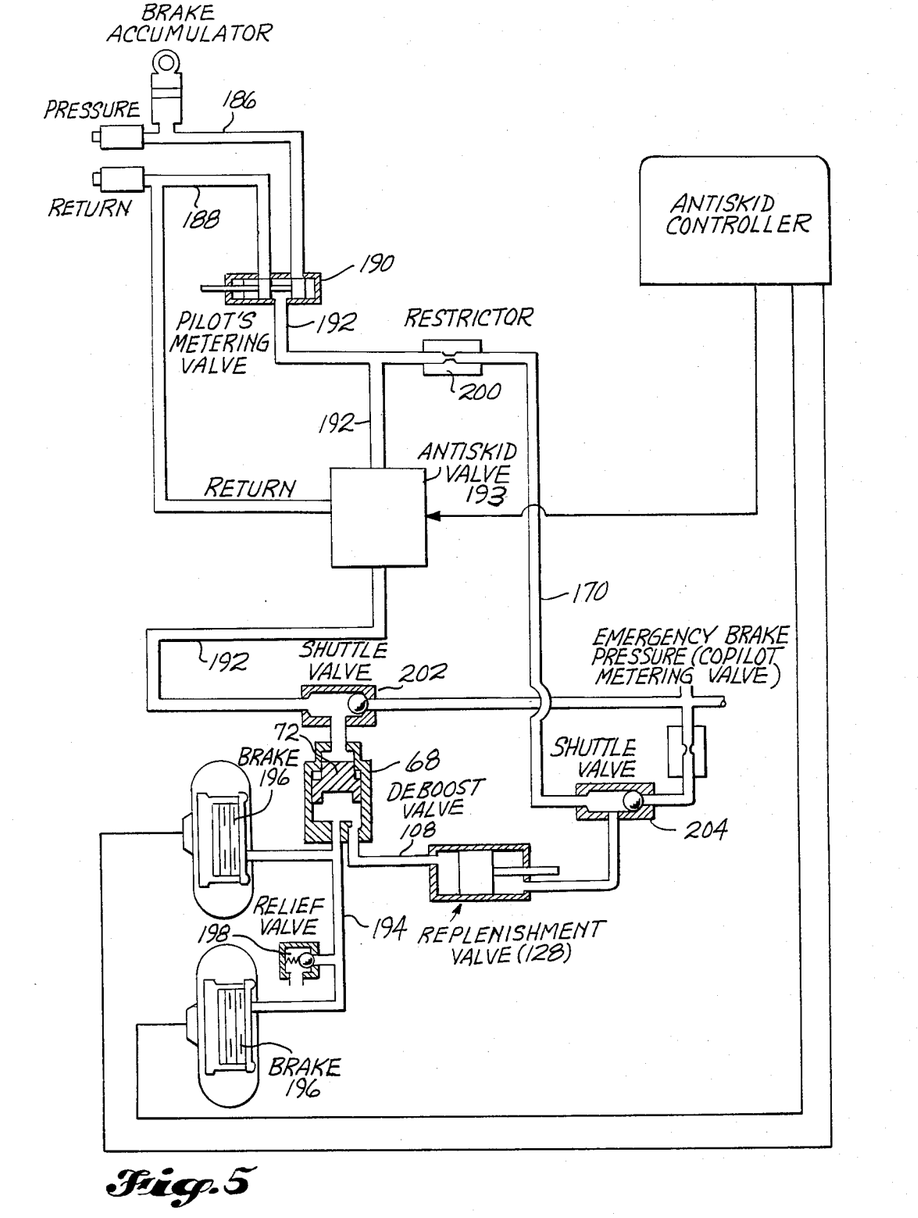
FIG. 5 is a view like FIG. 2, but of the two-fluid system of the present invention.
Figures 6, 7, 8:
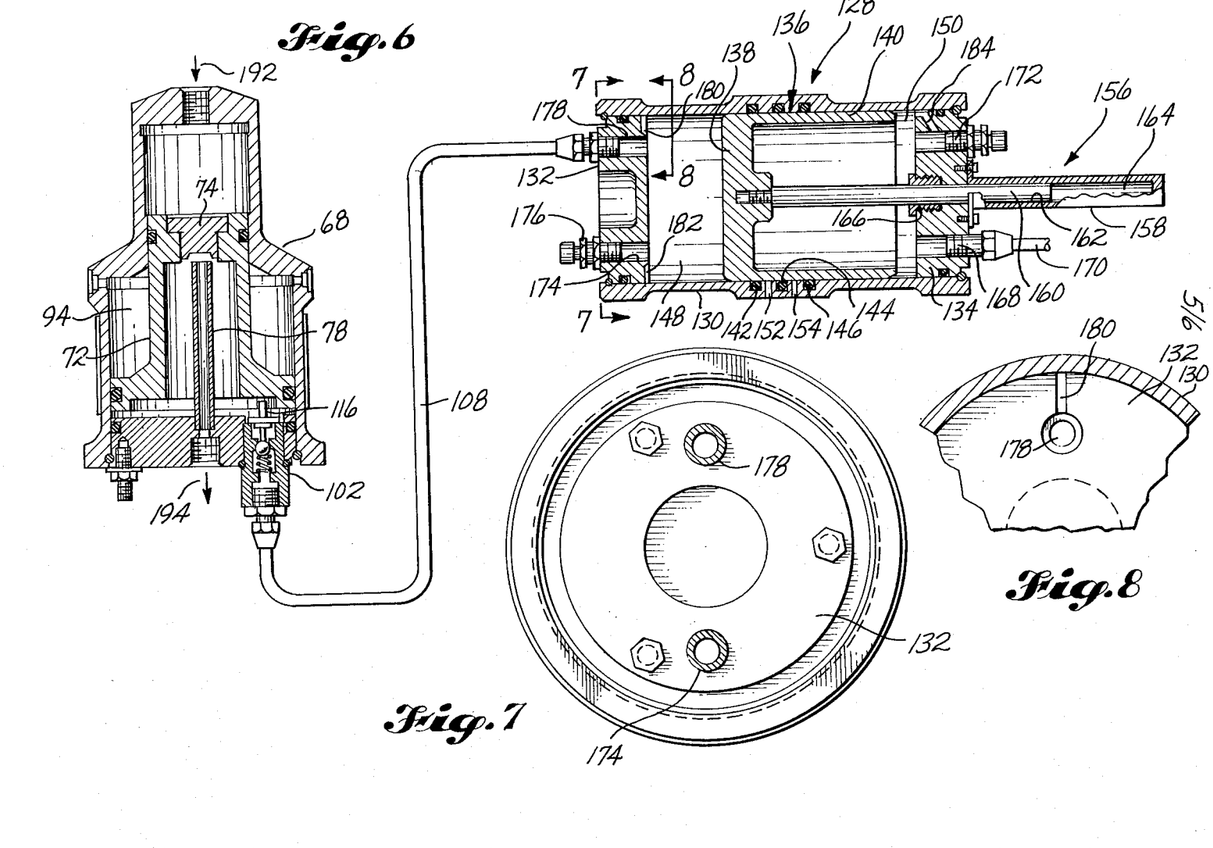
FIG. 6 is an enlarged scale view of the pressure transmitter and the replenish reservoir portions of the system shown by FIG. 5.
FIG. 7 is a sectional view taken substantially along line 7—7 of FIG. 6.
FIG. 8 is a fragmentary sectional view taken substantially along line 8—8 of FIG. 6.

Each tandem-wheel pair has its own nonflammable hydraulic fluid replenishment system (FIG. 5). The schematic diagram for the entire brake system would look very much like the system disclosed by FIG. 1, but modified in accordance with the changes shown in FIG. 5, for each tandem-wheel pair.

The replenish system comprises a replenish valve 102 which is incorporated in the end cap 76. Valve 102 includes a housing 104 having an inner end which is received within an axial opening 106 provided in end cap 76. The outer end of housing 104 is connected to a conduit 108 which is innerconnected between valve 102 and a reservoir for additional nonflammable hydraulic fluid. Valve 102 includes a valve seat at 110. A ball type closure element 112 is normally seated against valve seat 110 by a spring 114. A poppet element 116 is positioned inwardly of ball element 112. It includes a first-end portion 118 which extends towards piston 72, a second-end portion 120 which extends towards ball element 112, and a flange 122 between the two end portions 118 and 120. A spring 124, positioned between flange 122 and an internal shoulder 126 within valve 102, normally biases the poppet 116 towards the piston 72 and away from the ball element 112.

Referring now to FIG. 6, the reservoir 128 for additional nonflammable hydraulic fluid may comprise a cylindrical housing 130 having an end cap 132 at one of its ends and an end cap 134 at its opposite end. A piston type follower 136 is positioned within the interior of housing 130. It includes a radial end wall 138 and a cylindrical sidewall 140. A high-pressure seal 142 is located within a first circumferential groove formed in the sidewall of housing 130. A second lower-pressure seal 144 may be provided in a second circumferential groove formed in the sidewall 130. A third seal 146 may be formed in a third circumferential groove formed in sidewall 130.

The additional or makeup fluid is located in chamber 148, between end cap 132 and follower end wall 138. Thus, seal 142 which is located closest to this chamber 148 is a high-pressure seal and is made from a material that is compatible with the particular hydraulic fluid which is stored in chamber 148. In the example system, in which CTFE fluid is provided in chamber 148, the seal material for seal 142 is the same material that is used in device 68 for seal 86, i.e. Firestone phosphonitrilic fluoroelastomer (PNF). The center seal 144 may be made out of the same material. Seal 146 which is positioned closest to end cap 134 is constructed from a material which is compatible with the particular pressure fluid that is introduced into chamber 150. In the illustrated example, MIL-H-5606 fluid is introduced into chamber 150 and the seal material used for seal 146 is the same material that is used in device 68 for seal 82, i.e. Buna N Nitrile.

Seal 142 should, by itself, provide against leakage from chamber 148 towards seal 146. However, should leakage occur, an annular groove formed in the sidewall 130 collects the leakage and directs it to vent holes 152. In similar fashion, should leakage occur from chamber 150 across seal 146, the fluid would be collected by an annular groove formed in sidewall 130 between seal 146 and seal 144, and from such groove would be directed to a vent opening 154. The presence of seal 144 between the two annular grooves provides additional safeguard against leakage.

Preferably, the reservoir 128 is provided with a sight gauge 156 which is provided for indicating the quantity of fluid within chamber 148. The particular sight gauge that is illustrated comprises a tubular housing 158 which is mounted at its inner end to end cap 134. Housing 158 is axially directed and receives an axially extending indicater rod 160 which is connected at its inner end to follower end wall 138. Housing 158 need be formed to include a viewing port or window 162. The outer end portion 164 of rod 160 may be colored a bright color, such as red, and/or may be marked with indicia as the word "service". As the quantity of fluid within chamber 148 decreases, the rod 160 is moved to the left (as pictured) bringing the end portion 164 into registry with the window 162. The separate color of end portion 164 and/or the indicia on such end portion will signal that it is necessary to add additional fluid into chamber 148. A suitable seal 166 is provided to seal between end cap 134 and rod 160.

Each reservoir end cap, 132 and 134, contains two ports. End cap 134 includes a port 168 which is connected to a line 170 which supplied a pressure feed fluid. The second port receives a bleed valve 172. End cap 132 includes a fill port 174, in which a fill valve 176 is received, and an outlet port 178. The second end of conduit 108 is connected to the port 178.

As shown by FIGS. 6 and 8, two radial slots are machined in the inner surface of end cap 132. Slot 180 communicates with the inner end of port 178, and slot 182 communicates with the inner end of port 174. Referring to FIG. 6, a bleed port 184 is provided in end cap 134.

The chamber 148 is sized to account for volumetric changes due to temperature, brake wear, and normal fluid loss by leakage.

Referring to FIG. 5, in the preferred embodiment, the pressure fluid that is introduced into chamber 150 for pressure feeding additional relatively nonflammable fluid into the system is the same fluid that is used in the system on the control side of pressure transmitter 68, i.e. the relatively flammable fluid.

Referring now to FIG. 5, the system that is shown includes a first conduit 186 which is at supply pressure. This conduit and a return conduit 188 are connected to a three-way pilot-controlled metering valve 190. The third conduit that is connected to valve 190 extends to the inlet of pressure transmitter 68. This conduit 192 includes an antiskid valve 193 which forms no part of the present invention. The antiskid valve 193 is shown in schematic form in FIG. 1.

The fourth conduit of the system is conduit 194 which connects the brake side of pressure transmitter 68 with the wheel brakes 196. This conduit 194 may include a conventional pressure relief valve 198. Conduit 108 which extends between reservoir chamber 148 and the brake side of piston 72 is a fifth conduit in the system. Conduit 170 is a sixth conduit in the system. It is innerconnected between conduit 192 and the feed pressure inlet 168 for the replenish reservoir 128. Conduit 170 includes a restrictor 200.

The pressure within conduit 192 will be herein referred to as pilot metered pressure. This pressure is supplied to conduit 170 through restrictor 200 for the purpose of eliminating the dynamic effect which the addition of fluid from conduit 192 into chamber 150 would have upon the response and performance of the control system.

The use of pilot metered pressure to feed additional relatively nonflammable second fluid into the system when needed eliminates the need for a high-pressure air-charged accumulator for performing the replenish function. The use of such an accumulator would cause the brakes to lock if leakage occurred through the replenish valve 102. In the system shown by FIG. 5, the reservoir chamber 148 is pressurized and replenishment occurs only when braking is commanded. Thus, when braking is not commanded (as in flight) the entire brake system (pilot metered pressure, the pressure in chambers 148 and 150, and the pressure between piston and the brakes) is at return pressure and no brake pressure build-up can occur due to replenish valve leakage.

Replenishment, as in the prior art system shown by FIGS. 1-4, occurs only when the piston 72 is within a small distance from a completely bottomed condition at the low-pressure end of the pressure transmitter 68. By way of example, this distance may be about 0.125 inches.

Referring to FIG. 9, replenishment occurs when the piston 72 contacts end portion 118 of poppet 116 and moves it against ball member 112, moving ball member 112 away from its seated position. Replenishment fluid from reservoir 148 enters the low-pressure end of pressure transmitter 68 at the same pressure (not considering antiskid activity) as the original system pressure which in the example system is approximately 3,000 psi. In addition, during braking, the piston 72 rides or functions at the same level (near the replenishment level) and with the same stroke as an unmodified deboost valve in a system of the type shown by FIGS. 1-4.

For aircraft brake hydraulic systems that operate at the system pressure of 3,000 psi (and therefore do not use deboost valves) a mechanical isolation and replenishment system identical to that shown in FIGS. 5-7 would be used. However, in that case, a near equal-area isolation piston would replace the differential area piston shown in FIGS. 5, 6 and 9. Piston 72 in the example system has an approximately three-to-one piston area ratio.

The replenish system is pressurized normally by pilot-metered pressure. However, in the event of a failure, the system can be converted over to be pressurized by co-pilot-metered pressure. The necessary switchover valves are designated 202 and 204 in FIG. 5. The complete switchover system is shown in FIG. 1 in conjunction with the prior art system.

Since the fluid flow path from the high-pressure side to the low-pressure side of the pressure transmitter has been plugged in the two-fluid system, the need for quantity-measuring hydraulic fuses upstream of the deboost valve (shown in FIGS. 1 and 2) is eliminated.

The system approach shown by FIGS. 5-9 has two distinct advantages: (1) the brake hydraulic system is virtually unchanged and (2) it functions exactly the same as the original system. No modifications have been made which effect or change the dynamic operation of the pressure transmitter (known as a deboost valve in the prior system) or brake system. During normal brake system operation, the original brake system and the modified two-fluid brake hydraulic system are identical. The differences which exist between the two configurations involve only the replenishment system. The replenishment valve that, in the original system, is located within the pressure transmitting piston has been moved from such piston to the end cap at the brake end of the pressure transmitter. Since the replenish valve is closed (blocking the replenish path in both systems) during normal braking activity, the configurations of the two systems are identical. Thus, the brake and deboost valve modifications do not affect the normal operation of the brake system for the stopping performance of the aircraft. Similarly, other brake system operating modes such as parking, refuse takeoff, manual braking and emergency braking are not affected by the hardware modifications.

In summary, the modifications necessary to convert a KC-135 deboost valve to a fluid isolator, and the replenishment system additions which are necessary, to create the two-fluid system, are:

(1) The original replenish valve in the deboost piston is removed and a solid plug is installed in its place to eliminate the original fluid interchange path (such path being shown in FIG. 3);

(2) The original brake path at the end of the deboost valve, and the replenish pin, are discarded;

(3) A new end cap assembly is provided. It includes a bleed/output standpipe and a replenish valve assembly (FIG. 9);

(4) The end cap and the low-pressure piston seals are changed to a material which is compatible with the relatively nonflammable hydraulic fluid;

(5) A replenish system is added which includes a fluid reservoir, a refill valve for servicing, and a fluid-level indicator; and (6) Provision is made for bleeding the isolated second fluid.

Filling and bleeding the brake system is accomplished by ground servicing of the first-fluid portion of the system and then the second-fluid portion of the system. Servicing the first-fluid portion is formed by adding maximum pressure and cracking the reservoir bleed valve to circulate the first fluid through the brake system. The second-fluid portion is then serviced by opening the brake bleed valve and pumping the second fluid through the reservoir and the brakes. After bleeding, additional second fluid is added to fill the replenish reservoir chamber 148.

When the second-fluid portion of the system is serviced, the pressure-transmitter piston 72 is bottomed against the end cap 54. This causes an opening of the replenish valve and positions the inner end of the standpipe 78 within a cavity formed in the plug 74. Second fluid is then pumped through the fill valve 176 into the reservoir 148, and through the replenish valve 102 into the chamber 88, into the plug cavity, down the standpipe 78 and into the brakes and out of the brake bleed port. As second fluid passes through its portion of the system, any air in such portion of the system will be forced out through the brake bleed port. For example, air in the pressure transmitter 68 rises and collects in the plug cavity. This air is forced down the standpipe 78 and out the brake bleed port as the volume 88 fills with the second fluid.

Several features have been included in the two-fluid brake hydraulic system configuration to improve system safety.

Namely, four replenish systems, one for each tandem-wheel pair have been included in the system designed to prevent the loss of braking capability in the event of a failure. For example, if the hydraulic line between a pressure transmitter 68 and a set of hydraulic brakes were to burst, only the braking capability and fluid associated with that wheel pair and its replenishment system are lost. Normal braking capability and replenishment capacity is maintained on the other three paired-wheel sets. The replenishment reservoir is pressurized normally by pilot-metered pressure, and in the event of a failure, by the co-pilot-metered pressure through a shuttle valve system. This configuration prevents the loss of replenishment capability when pilot-metered pressure is lost.

We claim:

1. An aircraft ground wheel braking system, comprising:
   at least one ground wheel including a hydraulic brake;
   a pressure transmitter comprising a housing and a piston movable in said housing, and dividing said housing into a first chamber on one side of the piston and a second chamber on the opposite side of the piston;
   a brake control system including first conduit means containing a first relatively flammable hydraulic fluid at supply pressure, second conduit means containing first hydraulic fluid at return pressure, third conduit means connected to the first chamber of said pressure transmitter, and brake control valve means for switching between a first position in which the third conduit means is connected to the first conduit means, and a second position in which the third conduit means is connected to said second conduit means;
   fourth conduit means interconnected between the second chamber of the pressure transmitter and the hydraulic brake; and
   a relatively nonflammable second hydraulic fluid within said second chamber, said fourth conduit means and said hydraulic brake,
   whereby movement of the brake control valve means into its first position will communicate supply pressure provided by the first hydraulic fluid to the piston of said pressure transmitter and said piston will transmit such pressure to the second hydraulic fluid, and the pressurized second hydraulic fluid will apply the hydraulic brake, and the first hydraulic fluid will be isolated from heat generated by the applied brake.

2. An aircraft ground wheel braking system according to claim 1, further comprising a replenish system for the second hydraulic fluid, including replenish valve means operable in response to movement of the piston into a predetermined position for allowing an additional quantity of the second hydraulic fluid into the portion of the system comprising the second chamber, the fourth conduit and the brake.

3. An aircraft ground wheel braking system according to claim 2, wherein said replenish system comprises a replenish reservoir containing a quantity of the second hydraulic fluid, fifth conduit means leading from said reservoir to said replenish valve, and means for pressure feeding second hydraulic fluid out from said reservoir and through said fifth conduit means and said replenish valve when said replenish valve is open.

4. An aircraft ground wheel braking system according to claim 3, wherein said replenish reservoir comprises a housing and a follower within said housing which is movable against said second hydraulic fluid within said housing to force feed said second hydraulic fluid out from said reservoir and into said fifth conduit means when said replenish valve is open.

5. An aircraft ground wheel braking system according to claim 4, comprising a feed-pressure chamber within said housing on the opposite side of the follower from the second hydraulic fluid, and means for delivering fluid pressure into said chamber for forcing the follower against the second hydraulic fluid, to in that manner pressure feed second hydraulic fluid out from said replenish reservoir and into the fourth replenish conduit.

6. An aircraft ground wheel braking system according to claim 5, wherein said brake control system includes sixth conduit means extending between said third conduit means and the expansible chamber in said replenish reservoir, operable to deliver hydraulic pressure to the feed pressure chamber whenever supply pressure is within said third conduit means.

7. An aircraft ground wheel braking system according to claim 6, wherein said sixth conduit includes a pressure-reducing orifice for eliminating any dynamic effect which the addition of first hydraulic fluid into the feed pressure chamber of the replenish reservoir would have upon the response and performance of the brake control system.

8. An aircraft ground wheel braking system according to claim 1, wherein the pressure transmitter piston is a differential area piston and has a small-area end portion directed into the first chamber and a large-area end directed into the second chamber, and said pressure transmitter performs a deboost function.

9. An aircraft ground wheel braking system according to claim 8, wherein the pressure transmitter housing is a stepped housing having a first-end portion in which the first chamber is situated and a larger second-end portion in which the second chamber is situated, and wherein the small-area end portion of the piston is slidably received within the small-end portion of the housing and the large-area end portion of the piston is slidably received within the large-end portion of the housing, wherein a first seal means is provided between the small-end portion of the piston and the first-end portion of the housing and such seal is constructed from a material which is compatible to the first hydraulic fluid, and wherein a second seal is provided between the large-end portion of the piston and the second-end portion of the housing, and such second seal means is constructed from a material which is compatible with the second hydraulic fluid, and wherein the region of the housing between the piston shoulder and the housing shoulder includes an air space.

10. An aircraft ground wheel braking system according to claim 9, wherein said air space is vented to the atmosphere.

11. A method of at least reducing the likelihood of a hydraulic fire in a hydraulic actuator system, in which hydraulic pressure is applied through conduit means to an actuator which moves a load, and the actuator is in a high temperature zone and/or the load is the type which generates heat when so moved, while continuing to use in such system a relatively flammable first hydraulic fluid which is otherwise desirable, comprising:
   positioning a mechanical isolater in the conduit means of a type comprising a housing and a piston movable in said housing, and dividing said housing into a first chamber on one side of the piston and a second chamber on the opposite side of the piston;

providing a relatively nonflammable second hydraulic fluid in the system between the piston and the actuator;

using the relatively flammable hydraulic fluid in the the system to apply pressure to said piston; and using said piston to transmit the pressure to the second hydraulic fluid.

12. A method according to claim 11, comprising adding additional relatively nonflammable second fluid to the system between the piston and the actuator when the quantity of such relatively nonflammable second fluid in such portion of the system falls below a predetermined amount.

13. A method according to claim 12, comprising pressure feeding the additional relatively nonflammable second hydraulic fluid into the system between the piston and the actuator by use of pressure provided by the first hydraulic fluid at the same time such first hydraulic fluid is being directed against the piston to transmit pressure through said piston to the second hydraulic fluid.

14. A method according to claim 11, comprising further isolating said first and second hydraulic fluid by separate seals between the housing and the piston and an air space in said housing between said seals.

15. A method of at least reducing the likelihood of a hydraulic fire in an aircraft ground wheel braking system, in which hydraulic pressure is applied through conduit means to a hydraulic brake on a wheel, and said brake generates heat when applied, while continuing to use in such system a relatively flammable first hydraulic fluid which is otherwise desirable, comprising:

positioning a mechanical isolater in the conduit means of a type comprising a housing and a piston movable in said housing, and dividing said housing into a first chamber on one side of the piston and a second chamber on the opposite side of the piston;

providing a relatively nonflammable second hydraulic fluid in the system between the piston and the brake;

using the relatively flammable hydraulic fluid in the the system to apply pressure to said piston; and using said piston to transmit the pressure to the second hydraulic fluid.

16. A method according to claim 15, comprising adding additional relatively nonflammable second fluid to the system between the piston and the brake when the quantity of such relatively nonflammable second fluid in such portion of the system falls below a predetermined amount.

17. A method according to claim 16, comprising pressure feeding the additional relatively nonflammable second hydraulic fluid into the system between the piston and the brake by use of pressure provided by the first hydraulic fluid at the same time such first hydraulic fluid is being directed against the piston to transmit pressure through said piston to the second hydraulic fluid.

18. A method according to claim 15, comprising further isolating said first and second hydraulic fluid by separate seals between the housing and the piston and an air space in said housing between said seals.

19. A hydraulic actuator system, comprising:
a load; a hydraulic actuator connected to said load;
a pressure transmitter comprising a housing and a piston movable in said housing, and dividing said housing into a first chamber on one side of the piston and a second chamber on the opposite side of the piston;

a control system including first conduit means containing a first relatively flammable hydraulic fluid at supply pressure, second conduit means containing first hydraulic fluid at return pressure, third conduit means connected to the first chamber of said pressure transmitter, and control valve means for switching between a first position in which the third conduit means is connected to the first conduit means, and a second position in which the third conduit means is connected to said conduit means;

fourth conduit means interconnected between the second chamber of the pressure transmitter and the actuator; and a relatively nonflammable second hydraulic fluid within said second chamber, said third conduit means and said actuator, whereby movement of the control valve means into its first position will communicate supply pressure provided by the first hydraulic fluid to the piston of said pressure transmitter and said piston will transmit such pressure to the second hydraulic fluid, and the pressurized second hydraulic fluid will move the actuator, and the first hydraulic fluid will be isolated from the high temperature environment at the load.

20. A hydraulic actuator system according to claim 19, further comprising a replenish system for the second hydraulic fluid, including replenish valve means operable in response to movement of the piston into a predetermined position for allowing an additional quantity of the second hydraulic fluid into the system between the piston and the actuator.

21. A hydraulic actuator system according to claim 20, wherein said replenish system comprises a replenish reservoir containing a quantity of the second hydraulic fluid, fifth conduit means leading from said reservoir to said replenish valve, and means for pressure feeding second hydraulic fluid out from said reservoir and through said fifth conduit means and said replenish valve when said replenish valve is open.

22. A hydraulic actuator system according to claim 21, wherein said replenish reservoir comprises a housing and a follower within said housing which is movable against said second hydraulic fluid within said housing to force feed said second hydraulic fluid out from said reservoir and into said fifth conduit means when said replenish valve is open.

23. A hydraulic actuator system according to claim 22, comprising a feed-pressure chamber within said housing on the opposite side of the follower from the second hydraulic fluid, and means for delivering fluid pressure into said chamber for forcing the follower against second hydraulic fluid, to in that manner pressure feed second hydraulic fluid out from said replenish reservoir and into the fourth conduit.

24. A hydraulic actuator system according to claim 23, wherein said control system includes sixth conduit means extending between said third conduit means and the expansible chamber in said replenish reservoir, operable to deliver hydraulic pressure to the feed-pressure chamber whenever supply pressure is within said third conduit means.

25. A hydraulic actuator system according to claim 24, wherein said sixth conduit includes a pressure-reducing orifice for eliminating any dynamic effect which the addition of first hydraulic fluid into the feed-pressure chamber of the replenish reservoir would have upon the response and performance of the brake control system.

26. A hydraulic actuator system according to claim 19, wherein the pressure transmitter piston is a differential area piston and has a small-area end portion directed into the first chamber and a large-area end directed into the second chamber, and said pressure transmitter performs a deboost function.

27. A hydraulic actuator system according to claim 26, wherein the pressure transmitter housing is a stepped housing having a first-end portion in which the first chamber is situated and a larger second-end portion in which the second chamber is situated, and wherein the small-area end portion of the piston is slidably received within the small-end portion of the housing and the large-area end portion of the piston is slidably received within the large-end portion of the housing, wherein a first seal means is provided between the small-end portion of the piston and the first-end portion of the housing and such seal is constructed from a material which is compatible to the first hydraulic fluid, and wherein a second seal is provided between the large-end portion of the piston and the second-end portion of the housing, and such second seal means is constructed from a material which is compatible with the second hydraulic fluid, and wherein the region of the housing between the piston shoulder and the housing shoulder includes an air space.

28. A hydraulic actuator system according to claim 27, wherein said air space is vented to the atmosphere.

* * * * *